July 29, 1969  J. E. SKIDMORE  3,458,078
MEASURING DEVICE FOR PACKAGED PRODUCTS
Filed June 6, 1968

INVENTOR.
John E. Skidmore
BY
ATTORNEY

United States Patent Office 3,458,078
Patented July 29, 1969

3,458,078
MEASURING DEVICE FOR PACKAGED
PRODUCTS
John E. Skidmore, Hamilton, Ohio, assignor to The
Procter & Gamble Company, Cincinnati, Ohio, a
corporation of Ohio
Filed June 6, 1968, Ser. No. 735,133
Int. Cl. B65d 1/24, 1/36, 57/00, 85/00
U.S. Cl. 220—22                              6 Claims

ABSTRACT OF THE DISCLOSURE

A removable measuring device for defining separate compartments containing predetermined volumes of product within a container. The measuring device comprises a base and one or more partition members positioned perpendicularly thereto. Separate lifting means and venting means are provided to facilitate removal of the measuring device from its associated container.

Background of the invention

This invention relates to measuring devices positioned within containers. More particularly, it relates to a measuring device in the form of a package divider which defines predetermined volumes of the product therein packaged and includes separate lifting and venting means to facilitate removal of the device from a container.

Numerous products of a generally plastic consistency such as, for example, shortening, margarine, peanut butter, and the like, are packaged and sold in containers which, when opened, have a relatively wide mouth substantially equal in shape and area to that of the container body, such as, for example, cans, jars, tubs, and the like. A dispensing opening so sized permits dispensing of the product within the container by means of a spoon, spatula, or other convenient implement.

However, if the amount of product desired is greater than the amount conveniently accommodated on a spoon, as might be required by a recipe, it becomes necessary for the consumer to successively spoon out portions of the product until the required quantity is obtained. This frequently requires the transfer of the product from its original container to a separate measuring device, such as a measuring cup, especially when the quantity required is in larger quantities such as cups or fractions of a cup instead of teaspoons or tablespoons. The additional steps of successively transferring portions of the product to such a measuring device is both time consuming and inconvenient in that it requires the use of additional utensils which must later be cleaned after use.

It is an object of the present invention to provide a measuring device which will facilitate the convenient measurement of a quantity of product of plastic consistency packaged within a container.

Summary of the invention

Briefly stated, in accordance with one aspect of the present invention, a removable measuring device is provided for defining separate compartments within a container. The device comprises a base which has a cross section substantially the same as that of the container in which it is to be used to enclose at least one partition member attached to the base and positioned perpendicularly thereto to define predetermined volumes. Lifting means which extend from the partition member are provided to facilitate the lifting and carrying of the device, and vent means are positioned on the partition member to facilitate removal of the device from a container.

Description of the preferred embodiments

Figure 1:
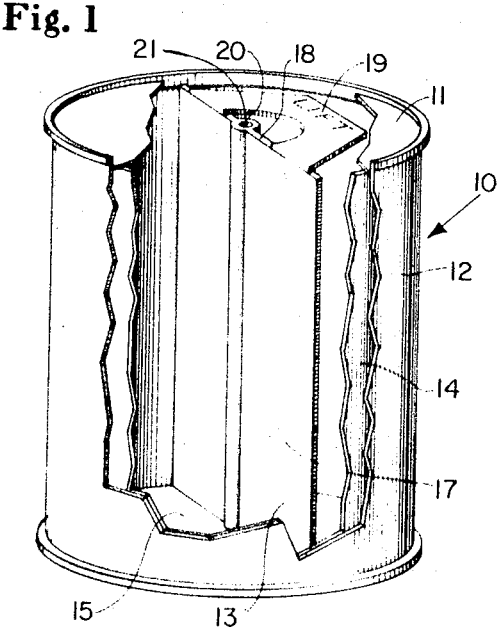
FIGURE 1 is a perspective view showing a closed container, partially broken away, without the product normally packaged therein but including the measuring device of the present invention positioned therewithin.

Referring now to the drawings, and particularly to FIGURE 1 thereof, there is shown a container 10 having a top wall 11 which, when removed, will define a wide dispensing opening of substantially the same shape and area as defined by the continuous sidewall 12. The measuring device 13 of the present invention is normally positioned within container 10 in axially telescoping arrangement in conjunction with an inner liner 14 positioned adjacent the inner surface of sidewall 12. Liner 14 is inserted between measuring device 13 and sidewall 12 of container 10, and facilitates removal of the device and product from the container in a manner to be more fully explained hereinafter.

The preferred form of container is cylindrical as shown in FIGURE 1 with a dispensing opening sufficiently large upon removal of top 11 to permit the withdrawal of measuring device 13. This type of container is exemplified by the conventional metallic can (known commercially as the sanitary can). Container 10 can also be fabricated from plastic, paperboard, foil-fiber laminates, or the like, or any combination thereof. Although the ensuing discussion will be based on the conventional can of circular cross section, it is to be understood that the measuring device of the present invention can be utilized with other types and shapes of packages wherein the sidewalls are not necessarily parallel, such as, for example, tubs wherein the sidewalls are tapered, or with containers of cross sections other than circular.

Figure 2:
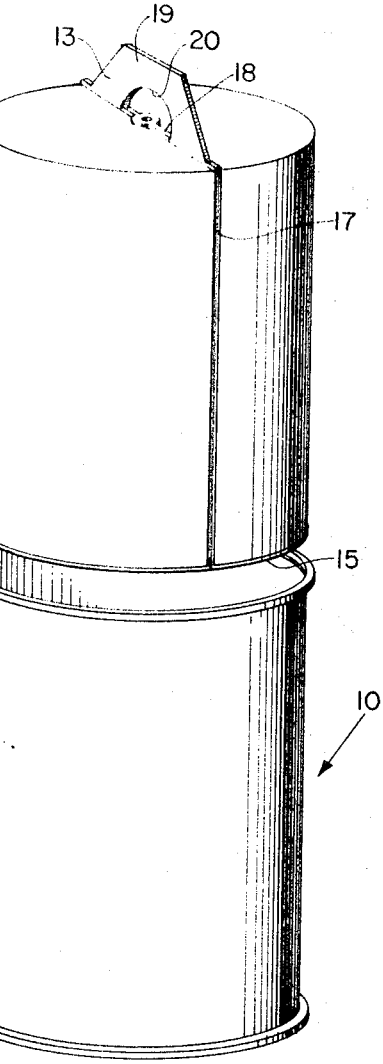
FIGURE 2 is a perspective view similar to FIGURE 1 but in which the top of the container has been removed and the measuring device, including the product normally packaged within the container, has been lifted therefrom.

Measuring device 13 comprises a base 15 which is preferably flat, as shown, in FIGURES 1 and 2, or it can be of any other desired configuration to conform with the shape of the base of container 10. Base 15 has a cross section in the principal plane thereof which is substantially the same as the cross section of container 10. In FIGURE 1 the device is shown in position within container 10. The product is not shown, purely for the convenience of illustration. In FIGURE 2 device 13 is shown removed from container 10 together with the product of plastic consistency normally packaged therewithin.

The outer peripheral portion 16 of base 15 conforms in shape and general size with that of the transverse cross-sectional area of the interior defined by side wall 12 of container 10. A dividing member 17 is perpendicularly attached to base 15 to provide a partition which, together with sidewall 12, defines two separated volumes of predetermined size. Dividing member 17 is preferably of the same height as the internal height of container 10 and has a width substantially equal to the corresponding internal dimension of container 10.

Attached to dividing member 17 along its upper distal edge 18 is a lifting means to permit the divider to be conveniently lifted from the container and reinserted therein. As shown in FIGURES 1 and 2, the lifting means comprises an integral tab 19 which is attached to and extends from the upper edge 18 of dividing member 17. Preferably, the lifting means includes a finger-receiving portion 20, whereby convenient handling of the measuring device is afforded. Alternatively, the lifting means can comprise a separate tab, a thin ring, a tab without a finger hole, or it can take any other form suitable for carrying out the lifting and removal function.

Venting means is provided on measuring device 13 to provide communication between the axial extremities thereof so that the lowermost surface of base 15 is vented to the atmosphere after the removal of top 11. This permits air to enter the lower portion of the container as measuring device 13 is being withdrawn. The vent greatly facilitates removal of the device and product in that it prevents the formation of a vacuum beneath measuring device 13 which would otherwise impede its removal from container 10. As shown in its preferred form in FIGURES 1 and 2, the venting means comprises a hollow passageway 21 extending the height of dividing member 17 and formed integrally therewith. Alternatively, the venting means can be provided by attaching a plurality of separate divider members 17 to a hollow tube which forms passageway 21.

The measuring device of the present invention can be fabricated from any number of materials as, for example, metal, plastic, or paperboard. When made from plastic, such as, for example, polyethylene, polypropylene, polyvinyl chloride, and the like, it is preferably molded in a single piece to provide strength for the structure. When made from paperboard it is preferably made from a paperboard of substantial thickness having an impervious coating to provide added strength to permit removal of the product from the container and to prevent the product from penetrating and thereby weakening the paperboard.

In use, an empty container 10 is provided which has a closed bottom and an open top. Inner liner 14 and measuring device 13 are inserted therein as shown in FIGURE 1 with the liner adjacent the inner surface of sidewall 12. The product is then poured into the container in the two spaces formed by dividing member 17 of measuring device 13 until the container is almost full. Preferably, the product, when packaged, is in fluid form and is then permitted to harden to an easily cuttable cellular or plastic consistency. The filling operation should be stopped when the product level is just below the upper edge 18 of dividing member 17 to preclude the obstruction of passageway 21 by the product. A cover is then applied to the container and it is subsequently sent through the normal distribution channels. Products which can suitably be so packaged include shortening, peanut butter, margarine, and other products which are in fluid or semisolid, flowable form when packaged and which subsequently form a product which can readily be cut or spooned from the container, as for example, products of plastic consistency.

When a consumer uses container 10, top 11 is first removed in the normal fashion. Measuring device 13 is then lifted and removed from container 10 as shown in FIGURE 2 by means of lifting tab 19 provided thereon. Hollow passageway 21, comprising the venting means, prevents the formation of a vacuum under measuring device 13, which would render its removal from container 10 more difficult. Vent 21 permits air to enter the space below measuring device 13 as the latter is being removed.

Although shown in connection with an inner liner, the device of the present invention can function satisfactorily without the liner and the latter is but an optional element which, although preferred, is not obsolutely necessary. Liner 14 is preferably inserted adjacent the inner surface of sidewall 12 of container 10 to preclude intimate contact between sidewall 12 and the product to thereby prevent direct adhesion of the product to sidewall 12 and thus facilitate removal of the product and measuring device from the container by reducing the shear force which would otherwise be necessary to break the bond between the plastic product and the sidewall of the container. Liner 14 is preferably formed from a material which will not adhere to the sidewall of the container and can be, for example, glassine, waxed paper, plastic film, or the like. When the consumer initially removes the product and measuring device from the container, liner 14 will adhere to the product and can be peeled therefrom and discarded. When the device and product are re-inserted into the container to be stored for later use, the product will not uniformly adhere to the complete inner sidewall to the same extent as when initially poured into the container in liquid form. Thus the removal force which is required for subsequent removals of the device is considerably less, and therefore the liner is no longer required.

After measuring device 13 and the product attached thereto have been lifted from container 10, the consumer can remove whatever quantity of product he desires. If the container is properly sized, the two halves defined by dividing member 13 and base 15 of the device can provide a predetermined quantity of product, such as, for example, one-half cup or one cup. After use, measuring device 13 is re-inserted within container 10 which can then be reclosed by means of a conventional flexible plastic overcap (not shown) and stored for subsequent re-use, assuming the product is not completely consumed in the course of the first use.

Figure 3:
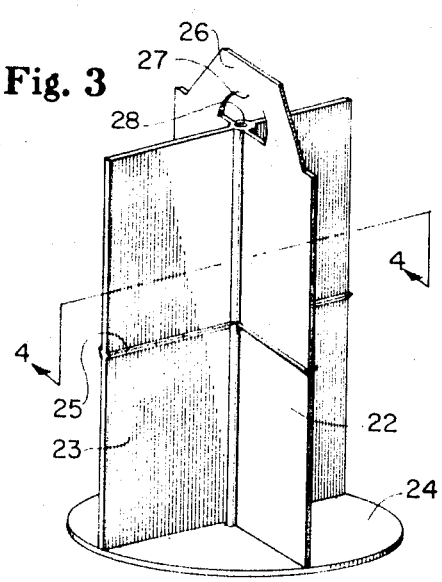
FIGURE 3 is a perspective view of another embodiment of the measuring device of the present invention including a pair of partition members and having ledge-type measuring means positioned on the partition members thereof.

Another embodiment of the measuring device of the present invention is shown in FIGURE 3. This particular embodiment includes two orthogonally positioned dividing members, 22 and 23, each of which is perpendicular to base 24, which divide the container into four equal quadrants and, depending upon the size of the container, can provide a different unit of measure than the embodiment shown in FIGURES 1 and 2. Additionally, dividing members 22 and 23 of FIGURE 3 can have quantity-defining means positioned thereon, which quantity-indicating means can take the form of a transversely extending ledge 25 positioned in a plane parallel to base 24 and which extends across both surfaces of the dividing members 22 and 23 and projects laterally therefrom a small distance. Ledge 24 serves as a guide for an implement, such as a knife, which can be used to cut and remove a predetermined quantity of the product. This quantity is dependent in part upon the positioning and number of ledges employed, which can, for example, define a quantity one-third or one-half the total quantity of one of the quadrants. The transversely extending ledge is shown in further detail in FIGURE 4, which is a cross-sectional view looking downwardly toward the base of the device and shows the relative lateral extent of the ledge 24 in comparison to the thickness of the dividing members 22 and 23. While shown in each quadrant of the measuring divice of FIGURES 3 and 4, ledge 24 can be positioned in fewer quadrants, if desired, thereby permitting the removal of different quantities of product from different quadrants.

Figure 4:
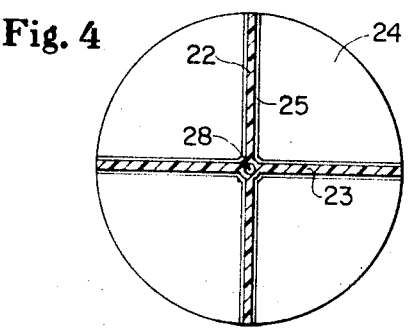
FIGURE 4 is a cross-sectional view taken along the line 4—4 of FIGURE 3 showing the relative lateral extent of the ledges.

The device shown in FIGURES 3 and 4 also includes a lifting means such as tab 26, which can include a finger-receiving opening 27. Also shown is a venting means comprising a hollow passageway 28 positioned at the intersection of dividing members 22 and 23 to provide communication between the axial extremities of the device.

Figure 5:
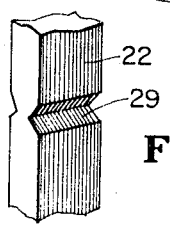
FIGURE 5 is an enlarged fragmentary view of another quantity-indicating means applied to the partition members of the measuring device.

Although the embodiment shown in FIGURES 3 and 4 has two orthogonally positioned dividing members, it would be apparent to one skilled in the art that any number of dividing members can be provided, depending upon the quantity in which the product packaged within the container is conveniently measured. Alternatively, other quantity-defining means can be provided either on dividing members 22 and 23 or on base 24. For example, as shown in FIGURE 5, a score-like quantity-defining means can be provided which comprises a groove 29, which can be molded, impressed, or cut into the sides of dividing members 22 and 23.

Although shown and described herein principally as a measuring device, it is readily apparent that the structure comprising the present invention also facilitates withdrawal of the product from within a container and permits it to be carried separately from the container. Thus, the present invention contemplates a combined product holder, or carrier, and measuring device.

While particular embodiments of the invention have been illustrated and described, it will be apparent to those skilled in the art that various changes and modifications can be made without departing from the spirit and scope of the invention.

What is claimed is:

1. A removable measuring device for defining separate compartments of predetermined volume within a container, said measuring device being adapted to telescope axially within said container and comprising:
   (a) a base having a cross section in the principal plane thereof which is substantially the same as the cross section of the interior of the container in which it is to be used;
   (b) at least one dividing member attached to said base and positioned perpendicularly with respect to said principal plane, said dividing member having a transverse width substantially equal to the corresponding internal dimension of said container;
   (c) lifting means attached to the distal end of said dividing member to facilitate the lifting and carrying of said device;
   (d) vent means associated with said dividing member providing communication between the axial extremities of said device and the bottom thereof to facilitate removal of said measuring device from said container.

2. The measuring device of claim 1 wherein said lifting means comprises a foldable handle integral with and extending from said dividing member.

3. The measuring device of claim 1 wherein said vent means comprises a hollow passageway integral with said dividing member and positioned centrally thereof.

4. The measuring device of claim 1 including a pair of orthogonally positioned dividing members perpendicular to and formed integrally with said base and wherein said lifting means comprises an extension of one of said dividing members.

5. The measuring device of claim 1 wherein said dividing member includes transversely positioned quantity-defining means thereon to facilitate the removal of a predetermined quantity of the product contained thereon.

6. A package for a product having a plastic consistency, said package comprising:
   (a) a container having a sidewall defining an interior of uniform cross section;
   (b) a removable measuring device including a base having a cross section in the principal plane thereof which is substantially the same as the cross section of the interior of said container, said measuring device having at least one dividing member attached to said base and positioned perpendicularly with respect to said principal plane, said dividing member having a transverse width substantially equal to the corresponding internal dimension of said container and including lifting means attached to the distal end thereof, said dividing member including vent means associated therewith providing communication between the axial extremities of said device to facilitate removal of said measuring device from said container; and
   (c) a liner positioned in contacting relationship with the inner surface of said sidewall to preclude intimate contact between said sidewall and said product.

References Cited

UNITED STATES PATENTS

| | | | |
|---|---|---|---|
| 411,854 | 10/1889 | Carter. | |
| 1,018,492 | 2/1912 | Hilton et al. | 220—22 |
| 1,155,447 | 10/1915 | Saunders | 220—93 |
| 1,795,849 | 3/1931 | Epple | 220—93 |
| 2,252,381 | 8/1941 | Ladd | 220—93 X |
| 2,334,595 | 11/1943 | Bailey | 220—93 |

JOSEPH R. LECLAIR, Primary Examiner

JAMES R. GARRETT, Assistant Examiner

U.S. Cl. X.R.

206—56; 312—73